(12) United States Patent
Barturen et al.

(10) Patent No.: US 7,735,080 B2
(45) Date of Patent: Jun. 8, 2010

(54) INTEGRATED SYSTEM AND METHOD FOR THE MANAGEMENT OF A COMPLETE END-TO-END SOFTWARE DELIVERY PROCESS

(75) Inventors: Maria-Jose Arbulu Barturen, Madrid (ES); Mariano Diez Fernandez, Madrid (ES); Ignacio Fernandez Gonzalez, Madrid (ES); Elisa Martin Garijo, Madrid (ES)

(73) Assignee: International Business Machines Corporation, Armonk, NY (US)

( * ) Notice: Subject to any disclaimer, the term of this patent is extended or adjusted under 35 U.S.C. 154(b) by 2377 days.

(21) Appl. No.: 09/943,563

(22) Filed: Aug. 30, 2001

(65) Prior Publication Data

US 2003/0046681 A1 Mar. 6, 2003

(51) Int. Cl.
G06F 9/445 (2006.01)
G06F 9/44 (2006.01)
G06F 15/177 (2006.01)

(52) U.S. Cl. .................... 717/177; 717/121; 717/172; 709/221

(58) Field of Classification Search ............... 717/168, 717/172–174, 177–178; 714/38; 709/221
See application file for complete search history.

(56) References Cited

U.S. PATENT DOCUMENTS

| 5,495,610 | A |   | 2/1996 | Shing et al. .............. 395/600 |
| 5,742,829 | A |   | 4/1998 | Davis et al. .............. 395/712 |
| 5,805,897 | A |   | 9/1998 | Glowny ................... 395/712 |
| 5,845,090 | A |   | 12/1998 | Collins, III et al. ..... 395/200.51 |
| 5,974,454 | A | * | 10/1999 | Apfel et al. .............. 709/221 |
| 6,110,228 | A | * | 8/2000 | Albright et al. .......... 717/178 |
| 6,192,518 | B1 |   | 2/2001 | Neal ....................... 717/11 |
| 6,223,345 | B1 | * | 4/2001 | Jones et al. .............. 717/100 |
| 6,226,784 | B1 |   | 5/2001 | Holmes et al. ............ 717/1 |
| 6,269,456 | B1 | * | 7/2001 | Hodges et al. ........... 714/38 |
| 6,427,230 | B1 | * | 7/2002 | Goiffon et al. ........... 717/108 |

FOREIGN PATENT DOCUMENTS

| WO | 00/73901 A1 | 12/0000 |
| WO | 0073901 A1 | 12/2000 |
| WO | WO 00/73901 | 12/2000 |

(Continued)

OTHER PUBLICATIONS

"The Software Distribution Process," *International Technical Support Organization*, IBM Corporation, SG24.5504.00, Sep. 1999.

(Continued)

Primary Examiner—James Rutten
(74) Attorney, Agent, or Firm—Dillon & Yudell LLP (57) ABSTRACT

A software delivery process including sub-processes of configuration management and version control, change and problem management, building, packaging, and distribution and installation. The process is implemented by an integrated management system that includes a configuration management sub-system, a change and problem management sub-system, a building sub-system, a packaging sub-system, a distribution sub-system, and a tracking sub-system. The sub-systems are integrated in order to manage the software along its whole life cycle, from development to installation in production. The tracking sub-system captures and integrates information about the status of the delivery from the other sub-systems along all steps of the process.

7 Claims, 4 Drawing Sheets

FOREIGN PATENT DOCUMENTS

WO          WO 00/73901 A1     12/2000

OTHER PUBLICATIONS

Defert P. et al., "Managing and Distributing Application Software," Proceedings of the Tenth Systems Administration Conference (LISA '96), Proceedings of the 10th Usenix Systems Administration Conference (LISA '96), Chicago, IL Sep. 29-Oct. 4, 1996, pp. 213-216; URL:http://asis.web.cern.ch/asis/LISA-96/paper
International Search Report for PCT/EP02/09683.
Written Opinion for PCT/EP02/09683.
Hitachi Windows NT/ NETM/DM (The fourth) 1-14 ; date of publication Apr. 1, 1997.
Japanese Sea4ch Report for corresponding Japanese patent application; Jun. 27, 2006.
Defert, P. et al. "Managing and Distributing Application Software", Proceedings of $10^{th}$ USENIX Systems Administration Conference, USENIX Association, Berkeley, CA, 1996 XP002226172, pp. 213-226.
International Search Report from European Patent Office, dated Feb. 11, 2008, 9 pages.

* cited by examiner

INTEGRATED SYSTEM AND METHOD FOR THE MANAGEMENT OF A COMPLETE END-TO-END SOFTWARE DELIVERY PROCESS

FIELD OF THE INVENTION

The present invention generally relates to the field of software delivery, and in particular to an integrated system and to a method to completely manage an end-to-end software delivery process, adapted to manage a software product along the whole life cycle thereof, from development to installation in production.

BACKGROUND OF THE INVENTION

Nowadays business processes of most companies are supported to a great extent by a wide array of software applications.

Since business processes are subjected to a constant evolution to adapt to new business requirements, the components of the software systems and applications that support the companies' business processes must frequently be changed and must dynamically evolve to implement the new requirements.

In this changing, dynamic environment, software delivery processes play a key role, not only in the software applications development area, but also in many different areas, activities and business processes of any company.

As a result, software delivery management has evolved as a software engineering discipline, within the enterprise systems management, that is focused on controlling the evolution of software and the implementation of changes to software systems.

The main objectives of the software delivery management are to enable the correct installation in different environments (such as the testing, training, production environments) of new software applications, as well as the control of changes or fixes to be applied to software applications already installed. In fact, software delivery enables deployment of (i.e., install and run) new releases or versions of the software applications, distribution and installation of fixes and patches to overcome bugs or problems encountered in existing applications, and alteration of the configuration of the software systems from one centralized point of administration. Software delivery also enables reinstallation and reconfiguration of systems after a system crash without requiring a site visit.

In practice, software delivery is a complex, delicate, and time consuming task that can range from distributing a single file to replacing an entire software system.

In proportion to the extent of change applied to a software system, the likelihood increases of an error during installation or an incompatibility with already-installed software. Since software delivery allows application of changes to a large number of systems at the same time, it is very important that these changes do not impact negatively on these systems; otherwise, they could lead to a massive user interruption or even a loss of business.

Generally speaking, the process of delivering software involves several actions. These actions include, for example, identifying the various components (e.g., source code modules, binary and executable files, configuration files, interfaces, data models, data structures, entities, procedures such as installation and configuration scripts, documents such as user guides, and the like) of the software product to be delivered; managing the different releases or versions of the components of the software product; identifying dependencies among the elements that compose the software system to which the software product is to be delivered; generating the items required to run the software product in the target system, i.e. in the target environment and platform; creating software packages containing the files, data, scripts, and utilities needed to install the software product in the target platform; distributing the software packages to the target system; and installing the distributed software packages in the target system.

Several different methods have been proposed for implementing certain parts or sub-processes of the complete delivery process outlined above. Some examples of the known methods are reported herein below.

U.S. Pat. No. 5,742,829, by Davis et al., entitled "Automatic software installation on heterogeneous networked client computer systems", provides a method for automatically installing software on heterogeneous client computer systems.

U.S. Pat. No. 5,845,090, by Collins, III et al., entitled "System for software distribution in a digital computer network", discloses a process of distributing software and data in a network by combining software and data, together with programs and data, known as methods, into single entities referred to as Packages, and then, by using specific techniques, transmits Packages from one computer to another. The process disclosed in this document covers the sub-processes for the transmission of distribution packages (programs and data installation), collection packages (methods for collecting data), and command packages (methods for system administration tasks).

U.S. Pat. No. 5,805,897, by Glowny, entitled "System and method for remote software configuration and distribution", deals with a system and method for remote software installation and maintenance.

U.S. Pat. No. 6,192,518, by Neal, entitled "Method for distributing software over network links via electronic mail", discloses a method, apparatus, and an article of manufacture for distributing a software applications through a network via electronic mail.

U.S. Pat. No. 6,226,784, by Holmes, entitled "Reliable and repeatable process for specifying, developing, distributing and monitoring a software system in a dynamic environment", describes a general process for project management purposes. The process is limited to managing the software life cycle just during the development thereof in a laboratory environment.

The above-named United States patents are incorporated in their entireties herein by reference.

As another example of the systems and methods that have been described in the prior art, the publication entitled "The Software Distribution Process", by the International Technical Support Organization, IBM Corporation, SG24.5504.00, September, 1999, describes the software distribution and installation sub-processes. Every step is described in detail, explaining how and when it is implemented. However, any other sub-processes involved in the software delivery process as a whole remain uncovered.

Most of the known methods are limited to cover only particular sub-processes of the complete software delivery process, such as the distribution sub-process and/or the unattended installation sub-processes. Other known methods are limited to covering specific needs of the software project management, and are not applicable to implement the software delivery process on business environments along the whole life cycle of the software product, from development to production.

As a practical implementation of the prior art systems and methods, information technology (IT) organizations of most companies have been installing a variety of separate, heterogeneous, isolated sub-systems to implement specific sub-processes of the whole software delivery process. For instance, a specific configuration management system (or application) might be used for controlling different versions of code; an unrelated system (or application) used for managing changes, another system for tracking problems in the software products and their solutions, and yet another separate tool for distributing software products to the different environments.

The lack of a proper end-to-end software delivery process, or the implementation of the process by means of isolated, stand-alone systems, frequently gives rise to the generation of poor quality software products, to delays in delivery plans, to cost overruns, or to the inability to meet customer demands.

The Applicant has observed that present methods are unable to encompass the nature of the changes to the different components of software applications, the dependencies and relationships between them, the multiple platforms on which they run, their multiple versions and their evolution through the different environments (such as development, building, unit tests, functional tests, integration tests, regression tests, system tests and production. Thus, there is a need for an end-to-end software delivery process able to manage the software system along its whole life cycle, from development to installation in production.

To address this need successfully, the various actions making up the complete end-to-end software delivery process should be neither independent nor isolated from each other. To the contrary, most if not all of them should be interrelated. In fact, these actions should be chained, since each action generates an output required by another action. Also, the end-to-end software delivery process should cover the complete life cycle of a new software product, e.g. a new application, managing it as a whole, and preserving the integrity thereof throughout the process. Furthermore, the software delivery process must take into account that software products are composed of different but interrelated parts, that are also related to other components and software products running on the same or on other target systems.

Thus, there remains a need for a global solution covering all the requirements given above, and for an end-to-end software delivery process based on an integrated management system that covers the complete life cycle of a software product, managing it as a whole and preserving its integrity, while taking into account that the software products are composed of different interrelated parts.

SUMMARY OF THE INVENTION

The present invention is directed toward solving the aforementioned problems.

In particular, it is an object of the present invention to improve the current systems and methods for delivering software products, covering the main requirements that should be fulfilled.

According to a first aspect of the invention, an integrated data processing system is proposed for managing a process of delivering of software products to target software product execution units in a network environment, where the target units may belong to a software product testing environment, a software product user training environment, or a production environment within the network environment. The integrated data processing system comprises: a central repository for storing software components of at least one software product; a first sub-system for identifying within the central repository software components of a software product to be delivered; a second sub-system for creating at least one software product package from the identified software components identified by the first sub-system; and a third sub-system for distributing the at least one software product package created by the second sub-system to the target software product execution units.

The target execution units to which the software product package is to be distributed are determined according to an indication of role assigned to the at least one software product package by the second sub-system.

In a preferred embodiment, the integrated data processing system comprises a software package distribution repository for storing the at least one software product package created by the second sub-system from the identified software components, which is to be distributed by the third sub-system.

The first sub-system also manages a storage in the central repository of the software components of software products to be delivered.

Preferably, the integrated data processing system further comprises a fourth sub-system for performing a building process of software code components among the identified software components of the software product to be delivered. The fourth sub-system stores a result of the building process in the central repository.

In a preferred embodiment, the integrated data processing system further comprises a fifth sub-system for managing a process of applying changes and/or fixes to an already delivered software product, and a sixth sub-system for recording information provided by the other sub-systems of the integrated data processing system during the delivery of the software product.

Another aspect of the present invention is a method for delivering software products to target software product execution units in a network environment. The method comprises the steps of:

storing software components of at least one software product in a central repository;

identifying software components of a software product to be delivered among the software components stored in the central repository;

creating at least one distributable software product package out of the identified software components;

distributing the software product package to the target software product execution units and installing the software product package thereon.

BRIEF DESCRIPTION OF THE DRAWINGS

The features and advantages of the present invention will be made apparent by the following detailed description of a preferred embodiment thereof, provided solely by way of non-limitative example, made with reference to the accompanying drawings, wherein.

DETAILED DESCRIPTION

The present invention provides an integrated management system and a method for the implementation of a complete, end-to-end software delivery process within a generic company having an information infrastructure.

Figure 1:
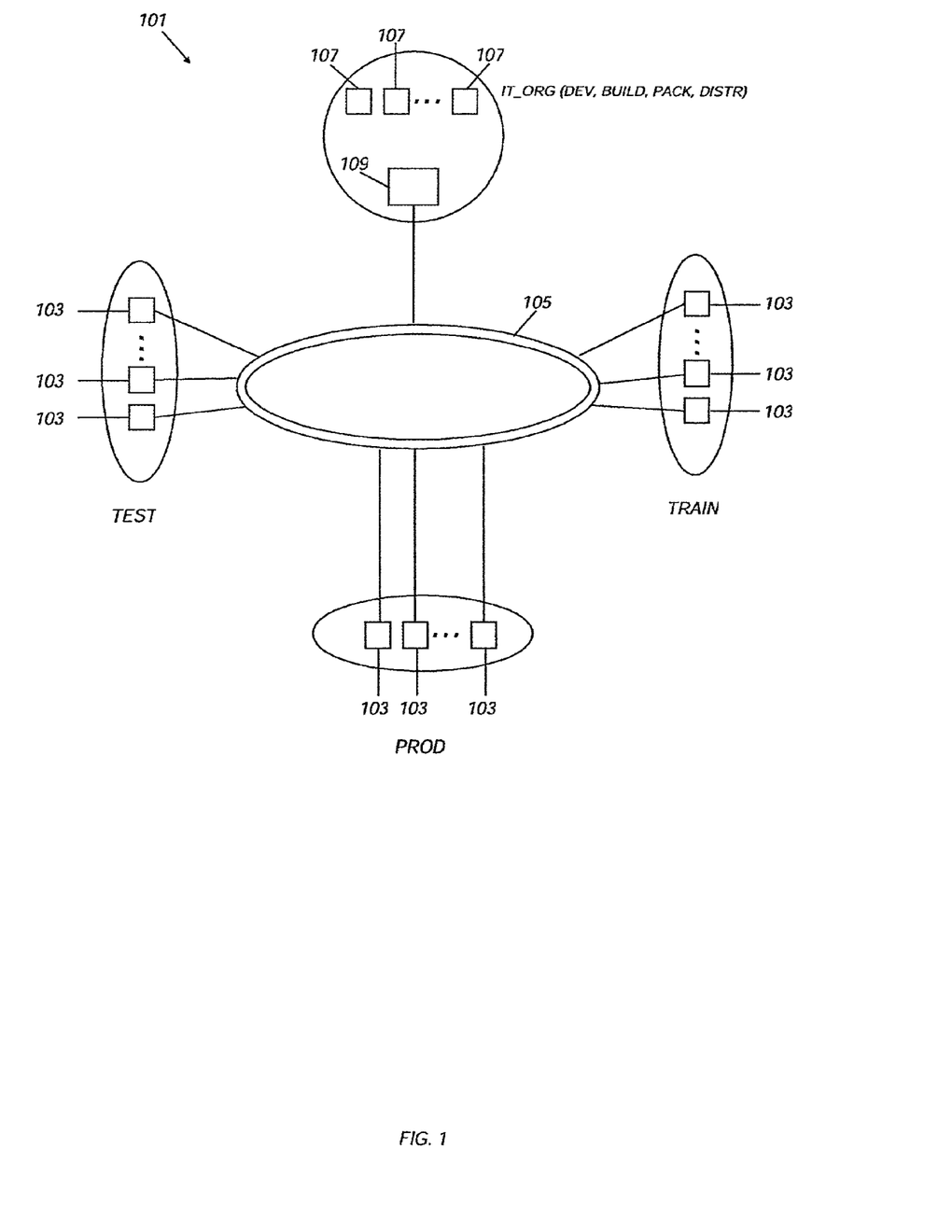
FIG. 1 is a simplified representation of an information infrastructure of a generic company.

The information infrastructure of a generic company is schematically depicted in FIG. 1. The infrastructure, globally identified by reference numeral 101, comprises a plurality of platforms 103 of different nature, such as personal computers, workstations, servers and the like, networked by means of a network 105, for example a local area network (LAN), a wide area network (WAN) or a combination thereof or any other kind of network. The platforms 103 may belong to a number of different environments, such as a test environment TEST in which the software products are tested, a training environment TRAIN in which the intended end users of the software products are trained in the use thereof, a production environment PROD in which the software product runs for its intended used in the day-by-day business management of the company.

The company also has an information technology (IT) organization IT_ORG, having the function of managing the company information infrastructure. The IT organization generally comprises several teams, such as for example a software product development team DEV responsible for the development of new software products; or new releases or versions of existing software products, a software product building team BUILD responsible for the process of building, starting from the software code, all the items required to run a software product in a target environment; a software package creation team PACK responsible for the creation of software packages to be distributed to the target platforms 103 in the prescribed environments; and a software package distribution team DISTR responsible for the distribution and installation of the software packages to the prescribed target platforms in the prescribed environments. The members of the various teams operate on platforms 107 networked to an integration server 109, in turn connected to the company network 105.

According to the present invention a proper and complete end-to-end software delivery process may include the following sub-processes: configuration management and version control, change and problem management, building, packaging, distribution, and installation.

The configuration management and version control sub-process enables identification of the components of a software product, such as source code modules, binary and executable files, configuration files, interfaces, data models, data structures, entities, procedures (installation and configuration scripts), and documents. Also, this sub-process manages the different releases and versions of the software product components during the development life cycle and keeps track of their evolution. It also enables identification of possible dependencies among elements of a target software system to which the software product may be delivered (such as platform, operating system, middleware, network considerations, etc.), and to gather all these elements together, managing them as a whole. Thus, this sub-process makes it possible to determine at any time the status of a target software system in a specific environment and phase.

The change and problem management sub-process enables control of the changes implemented to enhance the code or the fixes developed to solve encountered errors. Since software components that are generated or modified by the development team in order to implement a change or to fix a bug should be identified and controlled, this sub-process may operate in full integration with the configuration management and version control sub-process.

The building sub-process generates the items required to run a software product in a specified target system, i.e. in a specified target environment and platform. The successful implementation of this sub-process requires the correct implementation of the configuration management and version control sub-process. To this purpose, the building sub-process should know what needs to be changed, where to find the elements to be used in the process of building, and what procedures should to be triggered to successfully produce the new version of the software product.

The packaging sub-process generates software packages in installable format containing the required files, data, scripts, and utilities needed to support the installation sub-process. To assure the correctness of the installation sub-process, it is desirable, although not mandatory, that the installation be unattended, (i.e., without intervention by the end user). Toward this purpose, the generated package may also contain the necessary response files, on which the values of parameters, options, or possible answers requested during the installation sub-process may be correctly recorded.

The distribution sub-process makes the software package generated in the packaging sub-process ready for installation and available to the target system.

Finally, the installation sub-process installs the distributed software package in the target system, i.e. on the prescribed target platform in a corresponding environment (e.g., testing, production, training, etc.). This sub-process also creates log files, logging the changes applied to the target system in consequence of the installation of the software package. The installation sub-process may also inform the distribution management team about the completion of a successful and correct installation, or trigger an action if the installation fails.

The integrated management system according to a preferred embodiment of the present invention includes a plurality of different sub-systems, implementing the different sub-processes making up the software delivery process.

In particular, the integrated management system according to a preferred embodiment of the present invention comprises a configuration management sub-system implementing the configuration management and version control sub-process; a change and problem management sub-system implementing the change and problem management sub-process; a building subsystem implementing the building sub-process; a packaging subsystem implementing the packaging sub-process; and a distribution sub-system implementing the distribution and installation sub-processes.

Each sub-system performs one or more specific sub-processes of the software delivery process. The sub-systems are not isolated, but rather integrated and interrelated with each other in order to manage a software product along its whole life cycle, from development to installation in production.

Additionally, the integrated management system according to a preferred embodiment of the present invention comprises a tracking sub-system, integrated and interacting with the other sub-systems. The tracking sub-system captures and integrates information about the status of the software delivery from the other sub-systems along the various phases of the software delivery process. Phases of the process and issues detected within the phases may be recorded by the tracking sub-system. Also, the tracking sub-system may keep the members of the various teams within the IT organization informed about the software delivery process, according to their roles and responsibilities within such an organization.

Figure 2:
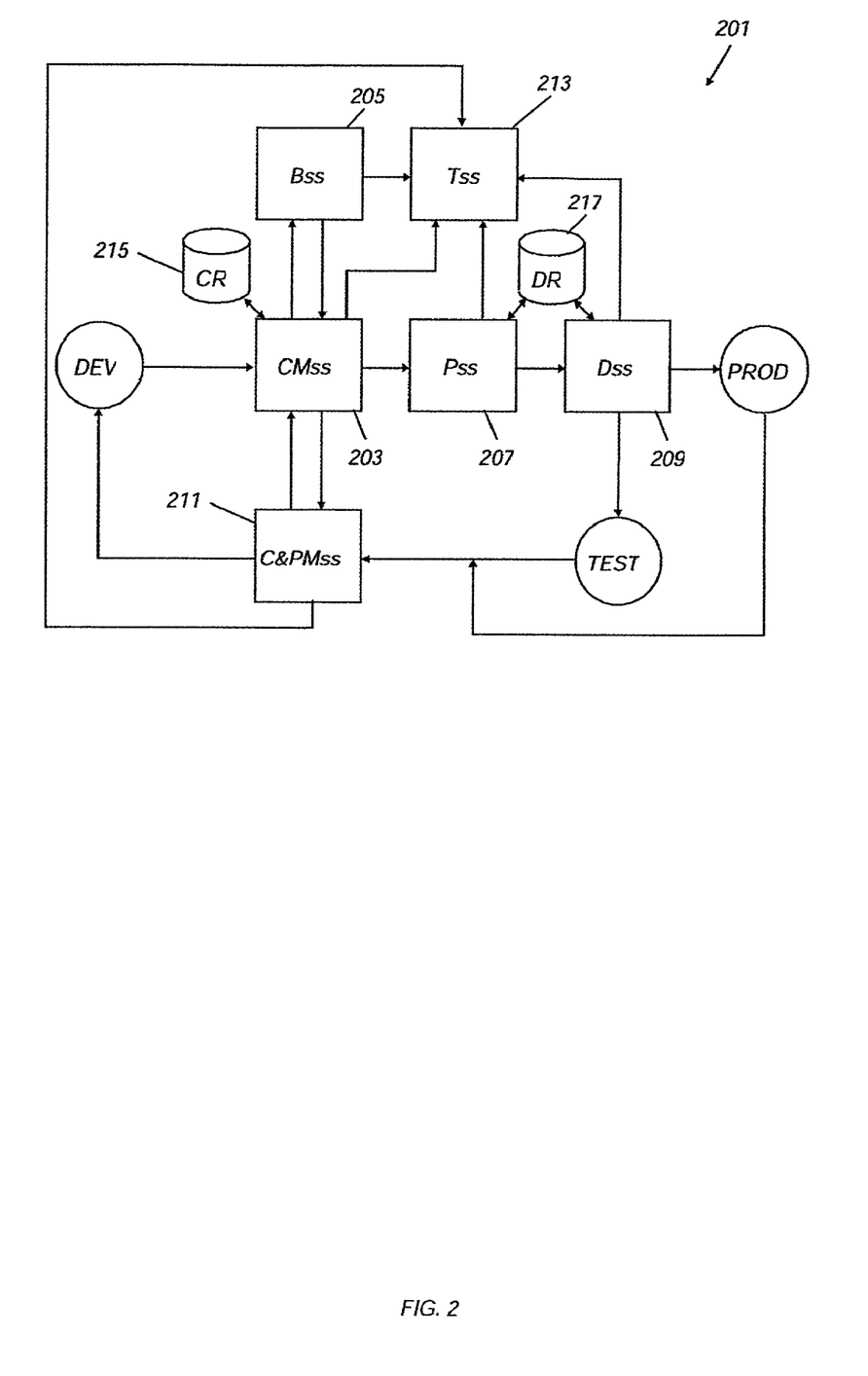
FIG. 2 is a block diagram of a software delivery integrated management system according to a preferred embodiment of the present invention.

FIG. 2 is a schematic block diagram of an end-to-end software delivery integrated management system according to a preferred embodiment of the present invention. The integrated management system is identified as a whole by reference numeral 201, and the component sub-systems are schematically represented as functional blocks. In particular, the configuration management sub-system is identified by block 203 (CMss), the building sub-system by block 205 (Bss), the packaging sub-system by block 207 (Pss), the distribution subsystem by block 209 (Dss), and the change and problem management sub-system by block 211 (C&PMss). Additionally, the tracking sub-system is identified by block 213 (Tss).

The configuration management sub-system 203, with which the development team DEV of the company IT organization interacts, has an associated secure central repository (CR) 215 and interacts with the building sub-system 205, the packaging sub-system 207 and the change and problem management sub-system 211. In turn, the packaging sub-system 207 interacts with the distribution sub-system 209. In a preferred embodiment of the invention, the distribution sub-system 209 has an associated software distribution repository (DR) 217. The software distribution repository 217 can be accessed by the packaging sub-system 207.

The distribution sub-system 209 is capable of distributing for the subsequent installation software products to prescribed target platforms 103 of prescribed environments, for example the production environment PROD and the testing environment TEST.

The change and problem management sub-system 211 receives feedback from the target platforms of the various environments where the software product has been installed.

The IT organization development team DEV interacts with the change and problem management sub-system 211 in the phase of development of changes or fixes to problems of the installed software product. The change and problem management sub-system notifies the development team that a fix or a change is required for an installed software product.

The configuration management sub-system 103, the building sub-system 105, the packaging subsystem 107, the distribution sub-system 109, and the change and problem management subsystem 111 may all interact with the tracking sub-system 113.

In FIG. 2, the functional interactions between the sub-systems, the repositories, the target environments and the development team are schematically represented as simple lines.

In order to implement and integrate the above described sub-systems with each other to form the integrated management system, according to the requirements of a project, existing software products and tools may be used, as well as other software components developed specifically for this purpose.

The specific functions of the various sub-systems will be now described in greater detail.

Generally stated, the configuration management sub-system 203 implements the configuration management and version control sub-process of the software delivery process. In particular, this sub-system performs the tasks of identifying, organizing, and controlling the components of a software product, such as source code modules, build scripts (i.e., makefiles), binary and executable files, interfaces, data models, data structures, entities, configuration files, installation scripts and response files, configuration scripts, and documentation components, for example delivery information, building guides, administration guides, operation guides and user's guides.

The above components of the software product may be, for example, developed by the development team or purchased from a software vendor, and may be provided by the development team to the configuration management sub-system 203.

The configuration management sub-system 203 stores the software components in the associated secure central repository 215.

Additionally, the configuration management sub-system 203 controls and manages the versions of the software components throughout their development life cycles, and keeps track of the evolutions thereof, enabling ready determination of the status, or the version of the code in a specific environment.

Furthermore, the configuration management sub-system 203 enables the recording of dependencies and relationships among the software components that make up the software product and to gather them all together, so they may be managed as a whole.

Thus, the configuration management subsystem 203 not only assures the integrity of the software product, but also the integrity of the whole system. All these functions reduce complexities and save implementation time, improve the quality and the productivity of the software production process, and simplify the reusability of previous software versions.

The change and problem management sub-system 211 implements the change and problem management sub-process of the software delivery process. In particular, this sub-system performs the following functions:

controlling the implementation of changes to a software product and the resolution of errors;

supporting the steps of the change and problem management sub-process. These steps include, for example, the detection of problems in already installed software products in either the testing, training, or production environments, the approval of a change, the verification of the output, the implementation of changes or the correction of bugs, etc.;

keeping track of changes and problems, assuring that the change and problem management sub-process is successfully realized and that changes are properly authorized;

assessing the impact of changes and problems, thus enabling decision making, saving costs, effort and time;

facilitating the problem determination process based on similar errors recorded and managed within the sub-system;

identifying which elements of code are sources of application problems, or which code elements must be modified to implement changes; and relating changes and fixes that have been made with problems solved in new versions of the software product, enabling their isolation on specific software elements, across multiple versions and environments.

To accomplish a correct problem and change management, a robust and proper configuration management, as well as an effective version control, are required. To this purpose, the change and problem management sub-system 211 may be fully integrated with the configuration management sub-system 203. Full integration means that the end user is able to determine version and release, and other characteristics of the software component to be changed in the central repository 215. The configuration management sub-system 203 and the change and problem management sub-system 211 may be thought of as a single sub-system, implementing the functions of configuration, version control, and change and problem management.

The building sub-system 205 implements the building sub-process of the software delivery process. In particular, this sub-system has the function of assuring that the source code stored in central repository 215 is correctly built, and of generating the binary files that are needed to run the software product on the target systems. This sub-system also enables identification of the version of source code from which binary files have been generated.

In greater detail, under the control of the configuration management sub-system 203 the building sub-system 205 automatically extracts from the central repository 215 the required source code components, and builds scripts and any other element required to build the software product. Then, this sub-system transfers these components to the proper building system. Depending on the type of source code, the building sub-system 205 triggers the appropriate building script, building system, and the target execution platform and environment, to get the corresponding version of the software.

Afterwards, the sub-system 205 automatically stores binary files that have been generated into the central repository 215, keeping track of the source from which they have been generated.

When the software system is not developed in-house by the IT organization but instead purchased from a software vendor, in most cases binary files are exclusively delivered and are not to be generated. In this case, the building sub-process need not be performed. The development team of the company IT organization supplies the binary files provided by the software vendor to the configuration management sub-system, which stores them, together with the other components of the software product, in the central repository 215.

The packaging sub-system 207 implements the packaging sub-process of the software delivery process, and generates the packages of the software product, readying them for distribution and installation in the target platforms of the prescribed environments. More specifically, the packaging sub-system 207 generates compressed software packages ready for distribution. These packages contain the software product binary files, either generated in the building sub-process or provided by a software vendor, and all the other files required, such as configuration files, initialisation files, response files needed for unattended installation on the target platforms, or end user's documentation. These files are automatically extracted by the packaging sub-system from the central repository 215 under the control of the configuration management sub-system 203, which identifies the components making up the software product which are stored in the central repository 215. The content of the package depends on the type of application code and target execution platform (hardware, operating system, middleware), while the packaging sub-process and the package format may be independent of the package content.

Then, on the basis of information provided by the packaging team of the IT organization and recorded in the tracking sub-system, the packaging sub-system 207 assigns to the generated software package a role that must match that of the target system where the software product will be finally installed. For instance, a target system role may be Windows NT SQL Server, MQ Series client, SAP NT Server, etc.

Preferably, the packaging sub-system 207 stores the generated software package in the software distribution repository 217 of the software distribution sub-system 209. Thank to this, using information provided by the tracking subsystem 213, every component of the software product on each platform can be easily identified, making it possible to get the corresponding installable package containing the correct version of each of these components from the software distribution repository 217. Additionally, each version of the software application may be built and packaged only once and subsequently revised since the package is stored in the software distribution repository 217 of the software distribution sub-system 209, while assuring that the resulting installation is identical, independent of the target environment (such as unit test environment, functional test environment, integration test environment, regression test environment, system test environment or production).

The software distribution sub-system 209 implements the distribution and installation sub-processes of the software delivery process, and performs the distribution and installation of the software packages on the correct target platforms of the prescribed environments. The software packages to be distributed, which may be stored in the software distribution repository 217, contain the software product binary files and any other required file, such as configuration files, initialisation files and response files needed for unattended installation, so that, once the installation of a package has been initiated, either requested by the integrated management system or forced by a target platform, no user intervention is required, thus ensuring the correctness of the installation process.

The distribution and installation of a software package may be performed according to any one of the conventional distribution methods, such as direct access distribution, streaming distribution, redirected distribution, cascaded distribution, publishing to web server distribution, or sending through e-mail distribution. All these methods, albeit distinct from each other, make use of either a "pull" distribution technique, a "push" distribution technique, or a combination thereof ("push-pull" distribution technique). In the pull distribution technique, the distribution of the software package is triggered by the end user that intends to install the software package on a target platform. In the push distribution technique, the distribution is initiated by the software distribution sub-system 209, which forces the software package from the software distribution repository 217 down to the target platforms. In the push-pull distribution technique, the distribution of the software package is performed by a combination of the push and pull techniques. Depending on different circumstances, any one of these techniques may be implemented and applied.

When, according to project directives, the installation of a software package has been authorized, the testing team, technical teams, end users, or any professionals involved (depending on the target environment) may be notified by the tracking sub-system 213.

The distribution sub-system 209 distributes the software package according to the role assigned thereto by the packaging sub-system 207.

The tracking sub-system 213 does not, strictly speaking, necessarily implement any specific sub-process of the software delivery process. Rather, this sub-system compiles information collected from the other sub-systems about the status of the delivery process of a generic software product along its whole life cycle. Every process step that is performed, every detail, and every event detected on the integrated management system may be recorded by the tracking sub-system 213. For example, as an information tool this subsystem provides information about different software product deliveries and software levels, building results, distribution or installation results, and delivery status.

In a preferred embodiment of the invention, the tracking sub-system 213 includes an electronic mail (e-mail) tool, that automatically delivers in the form of e-mail messages notifications to professionals involved in the delivery process when certain prescribed events occur, for example when there is a transition of the status of the delivery. Automatic notification by e-mail messages informs the members of the teams at the right times about the status of deliveries; in particular, this subsystem informs the team responsible for distribution about the delivery of the software packages.

The integrated management system outlined above carries out an end-to-end software delivery method that includes the following steps:

recording versions of the software product, including relevant details such as version number, platform, language, development team etc., in the tracking sub-system 213 by a team (e.g., a configuration management team) of the IT organization under the control of the configuration management sub-system 203, loading pieces of source code in the central repository 215;

managing source code within the configuration management sub-system 203, which assigns version numbers, stores the code, controls the accompanying documentation, etc.;

if not provided by a software vendor, building binary files from the source code stored in the central repository 215, by means of the building sub-system 205 and under the control of the configuration management sub-system 203;

under the control of the configuration management sub-system 203, loading the generated binary files and the other components of the software product, such as configuration and installation scripts, in the central repository 215;

under the control of the configuration management sub-system 203, extracting binary files, documentation, and configuration and installation scripts from the central repository 215 and, by means of the packaging sub-system 207, generating a software package to be distributed;

sending the generated software package to the distribution sub-system 209 for distributing the software package to prescribed target platforms in prescribed target environments;

under the control of the distribution sub-system 209, distributing and installing the software package on the target platforms of the prescribed environments, and updating the tracking sub-system during the process, recording therein the steps and issues.

Additionally, the method provides for managing software changes and fixes to already delivered software products under the control of the change and problem management sub-system 211.

Figure 3:
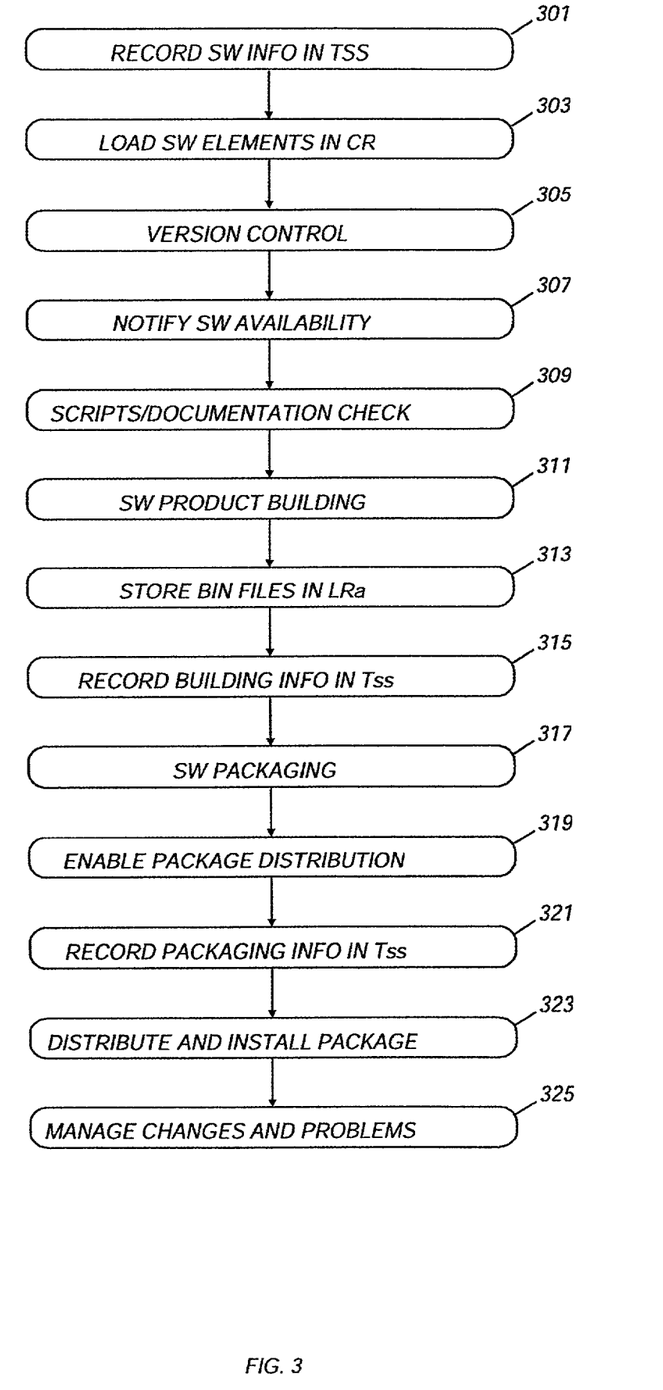
FIG. 3 is a flowchart schematically showing the main steps of a method according to a preferred embodiment of the invention for implementing an end-to-end delivery process by means of the integrated management system of FIG. 2.

Reference is now made to FIG. 3, which shows in terms of a simplified flowchart a preferred embodiment of the method according to the invention for implementing the end-to-end delivery process by means of the integrated software delivery system previously described.

The exemplary embodiment of the method that will be now described refers to the case in which a new software product is fully developed in-house by the development team of the IT organization of the company. However, the method according to the present invention is adapted to implement the complete end-to-end software delivery process independently of whether the software product is developed in-house or furnished by a software vendor. In the latter case, some of the steps (the steps relating to the process of building) of the method need not be carried out.

The method starts as soon as the development team of the company IT organization decides to develop a new software product, or a new release or version of an already existing software product in order to fix a bug or to make some changes.

First, (block 301) the development team records the relevant details of the developed software product in the tracking sub-system 213. Information that is recorded may include, for example, the name of the software product, the release/version number, the name of the leader of the development team, the target execution platform name, the language code, the product documentation references, the problems already fixed, the implemented changes, and so on.

Then (block 303), under the control of the configuration management sub-system 203, the development team loads into the central repository 215 the components of the software product that are required to build and run the software product. These elements include, for example, source code modules, build scripts (i.e., makefiles), build documentation, interfaces, data models, data structures, entities, configuration scripts or files, installation scripts and response files for the unattended installation and documentation, such as for example delivery information (application, date, problem fixed, changes applied, etc.), building guides, administration guides, operation guides, and user's guides.

As represented by block 305, the configuration management sub-system 203 controls the components of the software product stored in the central repository 215 and the versions thereof. To this aim, the development team records in the tracking subsystem 213 the information to be used by the configuration management sub-system 203 for performing the control, including the names of the repository component or components that contain the source code.

Once the development phase has been completed, using the tracking sub-system 213 the development team reports the availability of the software product (block 307) to the function responsible for delivering software in the IT organization.

Then (block 309) the building team checks that the building scripts and the documentation generated are correct. If during this check errors in the generated building scripts and/or documentation are encountered, this event is recorded by the building team in the tracking sub-system 213, which notifies the development team of the necessity of correcting the errors. After the development team corrects the errors, the preceeding steps are repeated, at least for the software components that have changed.

The software product is then built in order to generate the binary files required to make the software product run properly. As represented by block 311, these binary files are generated by the building sub-system 205 from the source code stored in central repository 215, under the control of the configuration management sub-system 203.

The building sub-system 205 then stores (block 313) the binary files generated in the previous step in the central repository 215.

As a next step (block 315), the building team records the information or issues (if applicable) related to the execution of the steps of blocks 309, 311 and 313 in the tracking sub-system 213 (e.g., successful or failed completion, relevant issues, lack of required documentation, etc.). The tracking sub-system 213 sends automatic notifications, for example in the form of e-mail messages, to the members of the building team when required.

At this point, the software application has been built. By means of the packaging sub-system 207 the packaging team generates the corresponding installable software package (block 317). Under the control of the configuration management and version control sub-system 203 the packaging subsystem 207 extracts from the central repository 215 the software components required to deploy (i.e., install and run) the software product on a prescribed target platform. These components may include items like binary and executable files, installation scripts (if required), response files for unattended installation, configuration scripts (if required), configuration documentation (if required), end user's documentation (i.e. user's guide), administration and operation documentation, and the other software product components that might be needed to deploy the software product in the prescribed environments and on the prescribed target platforms.

Since every element generated during the building sub-process should be included in the software package, the output of the building sub-system 205 is stored in the central repository 215 of the configuration management sub-system 203 and is supplied as an input to the packaging sub-system 207. In general terms, each software package should be self-contained, but depending on the specific design of the application and installation requirements, more than one package per software product to be installed may be used.

Once the software package has been generated, it is ready for distribution. Therefore, the generated software package is ready to be supplied to the software distribution sub-system 209. To this aim, the packaging sub-system 207 stores the software package in the software distribution repository 217 of the distribution sub-system 209 (block 319), to enable the distribution thereof.

The packaging team then records (block 321) information or issues related to the steps of blocks 317 and 319 in the tracking sub-system 213. The latter sends and distributes automatic notifications to the members of the team when required.

Using the distribution sub-system 209, the distribution and installation team distributes and installs (block 323) the software package in the target platform(s) of the target environment(s). The distribution and installation team also records information or issues related to this step in the tracking sub-system 213, which sends automatic notifications to the members of the team when required. Preferably, according to the company IT organization policies, the installation of the application package on the target environment may be subjected to the approval of an administrator team.

As represented by block 325, enhancements of the installed software products and fixes needed to solve application bugs are managed by the change and problem management sub-system 211, which may be fully integrated with the configuration management sub-system 203. Software changes and problem fixes should follow the process defined by the IT organization. The information related to application changes and bugs is recorded in the change and problem management subsystem 211. In case of a change, the requester of the change performs this task and, in the case of an error, the recording of this event is made by the organization that discovers it.

The process and the method for delivering a code version produced to implement a change or to fix a bug in an already installed software product are basically the same as any other delivered item. In fact, once the development of a new code version starts, it is recorded in the tracking sub-system 213. Also, the identifier of a change or a bug in the configuration management subsystem 203 should be recorded as part of the delivery information.

If a software product is not developed in-house by the company IT organization, but instead provided by a software vendor, the software delivery process begins when the software is received from the vendor. The staff responsible for the software delivery process is notified, which logs the delivery in the tracking sub-system 213. In this case, since only binary files in installable format should be delivered, and source code should neither be stored nor managed within the configuration management subsystem, the building sub-process is skipped.

Figure 4:
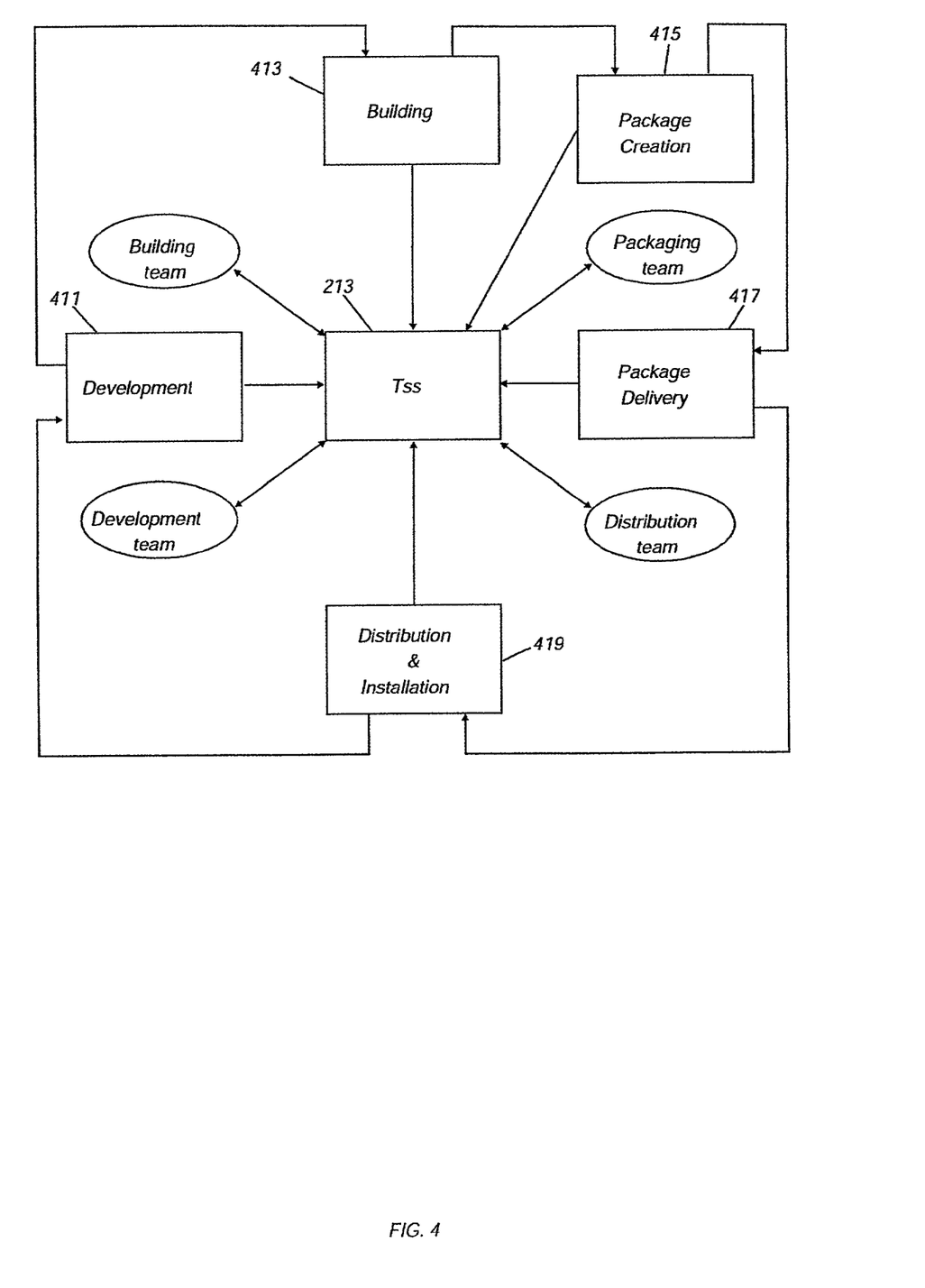
FIG. 4 schematically shows an information exchange between the sub-processes of the software delivery process implemented by the integrated management system and a tracking sub-system of the integrated management system of FIG. 2.

FIG. 4 is a schematic diagram showing how the main steps of the software delivery process provide information about the status of delivery, information which is recorded in the tracking sub-system 213. The tracking subsystem 213 acts as a central point for integrating the information generated by the delivery process and for tracking the status of the delivery. The information recorded in those steps is summarized as follows.

When initiating the development (block 411) of a new release or version of a software product, or a fix or a change of an existing software product, the development team records in the tracking sub-system 213 the relevant details, like the product name, version number, development team identifier, target execution platform, language code, software product documentation references, information related to the configuration management sub-system 203 (name of the central repository component that contains the source code), fixed problems, or implemented changes. When the software product is not developed in-house but instead is purchased from a software vendor, as has been stated before, usually only binary files should be delivered; even in this case, the supplied software should follow the delivery process flow, and the function responsible for the software delivery process should record the information of the vendor delivery in the tracking sub-system 213.

When the development phase finishes, the application is built (block 413) to generate the binary files required to run it. The building team, responsible for building the code (or the development team itself, if no such division of responsibilities exists in the IT organization) then records the information related to this step of the process in the tracking sub-system 213. Examples of the kind of information recorded are: configuration management sub-system information, such as the name of the central repository 215 component that contains the source code from which the corresponding binary files are generated, the name of the central repository 215 component that contains the generated binary files, the name of the central repository 215 component that contains building scripts and documentation (provided by development team), information about dependency relationships or prerequisites (inter-versioning, code sets versions, etc.); the building date, and building issues, if any.

Once the software product has been built, the corresponding installable package is generated (block 415) by the package sub-system 207. Then, the packaging team responsible for the packaging of software records the information related to this step in the tracking sub-system 213. Examples of the kind of information recorded are: configuration management sub-system information, such as the name of the software distribution repository 217 component that contains the scripts and response files required for enabling the installation, and the name of the software distribution repository 217 component that contains the application package; the package name; the role of the target execution platform; the packaging date; and packaging issues, if applicable.

Once the software package has been generated, it is ready for distribution (block 417). Then, the packaging team records the new status (package ready for distribution) of the package in the tracking sub-system 213.

When, possibly after approval, the distribution of the software package is requested, in order to be distributed and installed (block 419), the software package must be assigned to the correct target systems according to their role or function. The software distribution sub-system 209 performs the delivery of the software package to the target platforms and the distribution team responsible for distributing and installing the package records the new status (installed status) of the installed package in the tracking sub-system.

The most salient and advantageous features of the end-to-end software delivery integrated management system and method according to the present invention are the following.

The whole life cycle of a software product is managed as a single process, not as a set of unrelated, independent processes as in the prior art.

The integrated management software system of the present invention is a unique and global management system that supports the whole software delivery process. The sub-systems of the integrated management system are integrated with each other, and each of them implements a specific sub-process of the software delivery process.

The integrated management system according to the present invention is independent of the platforms, operating systems, repositories or databases utilized in specific implementations. Additionally, the integrated management system assures the integrity of software systems and their accurate performance, tracking and controlling dependencies and relationships between the different software components and the documentation, thus avoiding redundancies and ensuring that all pieces can be plugged together to work as required.

New software products or new releases or versions of already existing software products, such as fixes or modifications to already installed applications, are built from the central repository under the control of the configuration management sub-system.

Installable software packages are generated and distributed independently of the package content and of the destination systems, and can be installed by an unattended procedure.

Advantageously, new software versions (complete or incremental) may be built and packaged once and stored in the software distribution repository of the distribution sub-system, enabling reuse of the installation packages in different environments.

Additionally, the integrated management system enables the automatic extraction of software packages for unattended installation, enforces that the correct package is installed in the correct target system according to its role, enables retrieval at any time of the complete status information of a software system for any specific environment and phase.

Moreover, the integrated management system assures synchronization among the different versions or levels of the same software on different platforms, as well as synchronization among concurrent applications, running in parallel, on heterogeneous environments (i.e., development, building, unit tests, integration tests, regression tests, system tests, production) that very often are owned and managed by professionals in remote locations.

The system also may allow to keep audit trails of the software status.

It must be emphasized that the software delivery process herein described, and the system and method disclosed for implementing it, are applicable to any business, company, or IT organization facing the problem of implementing a software delivery process supported by a management system. In fact, the requirements and main features of the system described in this invention are general and independent of the specific embodiment.

It must be also understood that, according to specific requirements of a given organization or company, other embodiments may be utilized, and structural changes may be made without departing from the scope of the present invention, as defined by the appended claims.

We claim:

1. An integrated data processing system for managing a process of delivery of software products to target software product execution units in a network environment, comprising:
    a central repository for storing software components of at least one software product;
    a first sub-system for identifying within the central repository software components of a software product to be delivered;
    a second sub-system for creating at least one software product package from the identified software components identified by the first sub-system;
    a third sub-system for distributing the at least one software product package created by the second sub-system to the target software product execution units;
    a fourth sub-system for performing a building process of software code components among the identified software components of the software product to be delivered, the fourth sub-system storing a result of the building process in the central repository;
    a fifth sub-system for managing a process of applying changes to the at least one software product distributed by the third sub-system; and
    a sixth sub-system for recording information provided by at least one of the first through fifth sub-systems of the integrated data processing system during delivery of the software product.

2. A method of developing and installing a software product on a plurality of target computers, the method comprising:
    storing a plurality of components in a central repository;
    using at least some of the plurality of stored components to build the software product;
    storing the built software product in the central repository;
    creating an installable software package that includes at least some of the plurality of components and the built software product;
    storing the installable software package in a second repository;
    distributing the installable software package to at least some of the plurality of target computers; and
    installing the distributed installable software package on the at least some of the plurality of target computers.

3. The method of claim 2, wherein the software product comprises a newly developed software product.

4. The method of claim 2, wherein the software product comprises a new release and/or a new version of an already released software product.

5. The method of claim 2, further comprising recording information regarding the software product in a tracking sub-system.

6. The method of claim 2, wherein the built software product comprises execution code that is generated from a source code component stored in the central repository.

7. The method of claim 2, further comprising providing a configuration management subsystem that controls and manages different versions of the software components stored in the central repository.

* * * * *